(12) United States Patent
Wiegel et al.

(10) Patent No.: US 11,697,910 B2
(45) Date of Patent: Jul. 11, 2023

(54) IMPACT RESISTANT RETRACTABLE SAFELY BARRIERS

(71) Applicant: RITE-HITE HOLDING CORPORATION, Milwaukee, WI (US)

(72) Inventors: Aaron J. Wiegel, Benton, WI (US); David Swift, Dubuque, IA (US); Jason Dondlinger, Bellevue, IA (US); Joe Korman, Dubuque, IA (US); Matthew Robert Dwyer, Dubuque, IA (US); Tony Duesing, Bellevue, IA (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 113 days.

(21) Appl. No.: 16/999,831

(22) Filed: Aug. 21, 2020

(65) Prior Publication Data

US 2021/0054586 A1    Feb. 25, 2021

Related U.S. Application Data

(60) Provisional application No. 62/889,974, filed on Aug. 21, 2019.

(51) Int. Cl.
*E01F 13/04* (2006.01)
*E06B 9/80* (2006.01)
(Continued)

(52) U.S. Cl.
CPC ............ *E01F 13/048* (2013.01); *B65G 69/00* (2013.01); *E06B 9/80* (2013.01); *E01F 13/028* (2013.01); *E01F 13/04* (2013.01)

(58) Field of Classification Search
CPC ....... E01F 13/048; E01F 13/028; E01F 13/04; B65G 69/00; E06B 9/80; E06B 11/00
See application file for complete search history.

(56) References Cited

U.S. PATENT DOCUMENTS

| 165,186 | A | 7/1875 | Tower |
| 337,582 | A | 3/1886 | Hildreth |
| (Continued) |

FOREIGN PATENT DOCUMENTS

| CA | 2561113 | 10/2005 |
| CN | 2316435 | 4/1999 |
| (Continued) |

OTHER PUBLICATIONS

Gaylord Material Handling, DockStrap(TM) product advertising, available at www.callgaylord.com, accessed May 14, 2002, 1 page.
(Continued)

*Primary Examiner* — Phi D A
(74) *Attorney, Agent, or Firm* — Hanley, Flight & Zimmerman, LLC

(57) ABSTRACT

Impact resistant retractable safety barriers are disclosed. An apparatus includes a support member, a flexible elongate member to extend and retract through an opening in the support member, and a stop member including a region to interface with the flexible elongate member. The stop member engages with structure of the support member surrounding the opening to limit a distance with which the flexible elongate member extends through the opening. The stop member cooperates with the structure of the support member to maintain a gap between a surface of the region of the stop member and the structure of the support member. A width of the gap is equal to or greater than a thickness of the flexible elongate member.

18 Claims, 9 Drawing Sheets

(51) Int. Cl.
  *B65G 69/00*        (2006.01)
  *E01F 13/02*        (2006.01)

(56)         References Cited

U.S. PATENT DOCUMENTS

| | | | |
|---|---|---|---|
| 516,486 A | 3/1894 | Hartshorn | |
| 778,228 A | 12/1904 | Dodge et al. | |
| 824,930 A | 7/1906 | Hopkins | |
| 832,335 A | 10/1906 | McDonald | |
| 1,477,159 A | 12/1923 | Zinser | |
| 1,478,619 A | 12/1923 | Simons et al. | |
| 1,652,186 A | 12/1927 | Strauss | |
| 1,666,508 A | 4/1928 | Sawyer | |
| 1,828,296 A | 10/1931 | Sawyer | |
| 1,832,705 A | 11/1931 | Heck | |
| RE18,940 E | 9/1933 | Traut | |
| 2,088,046 A | 7/1937 | White | |
| 2,295,205 A | 9/1942 | Fraser | |
| 2,363,762 A | 11/1944 | Wardan | |
| 2,609,042 A | 9/1952 | Chamberlain | |
| 2,678,691 A | 5/1954 | Rust et al. | |
| 2,747,927 A | 5/1956 | Burkhead | |
| 2,773,547 A | 12/1956 | Voss | |
| 3,090,425 A | 5/1963 | Carlo | |
| 3,115,182 A | 12/1963 | Bobbitt | |
| 3,146,824 A | 9/1964 | Veilleux | |
| 3,187,761 A | 6/1965 | Maio | |
| 3,285,089 A | 11/1966 | Tsugawa | |
| 3,314,468 A | 4/1967 | Riedel | |
| 3,581,798 A | 6/1971 | Malamed | |
| 3,724,524 A | 4/1973 | Potter | |
| 3,803,943 A | 4/1974 | Woloszyk | |
| 3,868,078 A | 2/1975 | Zinn | |
| 4,119,301 A | 10/1978 | Payne | |
| 4,294,302 A | 10/1981 | Ricke, Sr. | |
| 4,356,668 A | 11/1982 | Wagner | |
| 4,595,155 A | 6/1986 | Gough | |
| 4,712,599 A | 12/1987 | Komaki | |
| 4,848,823 A | 7/1989 | Flohr et al. | |
| 4,849,735 A | 7/1989 | Kirtley et al. | |
| 5,005,827 A | 4/1991 | Steinbrecher | |
| 5,029,819 A * | 7/1991 | Kane | E01F 13/028 160/24 |
| 5,050,846 A | 9/1991 | Goodman et al. | |
| 5,078,197 A | 1/1992 | Weishar | |
| 5,118,056 A | 6/1992 | Jeanise | |
| 5,170,829 A | 12/1992 | Duncan et al. | |
| 5,271,183 A | 12/1993 | Hahn et al. | |
| 5,299,386 A | 4/1994 | Naegelli et al. | |
| 5,353,859 A | 10/1994 | Oltahfer et al. | |
| 5,459,963 A | 10/1995 | Alexander | |
| 5,503,211 A | 4/1996 | Engi | |
| 5,505,244 A | 4/1996 | Thumann | |
| 5,564,238 A | 10/1996 | Ellis | |
| 5,636,679 A | 6/1997 | Miller et al. | |
| 5,649,396 A | 7/1997 | Carr | |
| 5,660,144 A | 8/1997 | Venti | |
| 5,690,317 A | 11/1997 | Sandsborg | |
| 5,752,557 A | 5/1998 | Crider et al. | |
| 5,794,281 A | 8/1998 | Shearon | |
| 5,823,705 A | 10/1998 | Jackson et al. | |
| 5,875,597 A | 3/1999 | Gingrinch et al. | |
| 6,042,046 A | 3/2000 | Beyer, Sr. | |
| 6,056,038 A | 5/2000 | Foster et al. | |
| 6,142,701 A | 11/2000 | Falcon | |
| 6,186,274 B1 | 2/2001 | Reynolds et al. | |
| 6,244,324 B1 | 6/2001 | Quates et al. | |
| 6,279,276 B1 | 8/2001 | Knoll | |
| 6,312,214 B1 | 11/2001 | Nowak et al. | |
| 6,375,164 B1 | 4/2002 | Siegler et al. | |
| 6,375,165 B1 | 4/2002 | Sherratt et al. | |
| 6,431,819 B1 | 8/2002 | Hahn | |
| 6,485,225 B1 | 11/2002 | Baker | |
| 6,536,502 B2 | 3/2003 | Britto et al. | |
| 6,575,435 B1 | 6/2003 | Kotzen | |
| 6,595,496 B1 | 7/2003 | Langlie et al. | |
| 6,601,638 B1 | 8/2003 | Lafleur | |
| 6,634,139 B1 | 10/2003 | Metz | |
| 6,688,480 B1 | 2/2004 | Denny | |
| 6,715,973 B2 | 4/2004 | Faber et al. | |
| 6,733,204 B1 | 5/2004 | Paniccia | |
| 6,776,398 B1 | 8/2004 | Tsai | |
| 6,807,999 B1 | 10/2004 | Bowen et al. | |
| 6,830,236 B2 | 12/2004 | Augusto De Lorenzo | |
| 6,880,301 B2 | 4/2005 | Hahn et al. | |
| 6,969,185 B1 | 11/2005 | Adair | |
| 7,032,267 B2 | 4/2006 | Mitchell et al. | |
| 7,045,764 B2 | 5/2006 | Beggs et al. | |
| 7,207,370 B2 | 4/2007 | Snyder et al. | |
| 7,217,061 B2 | 5/2007 | Stratton | |
| 7,219,709 B1 | 5/2007 | Williams | |
| 7,237,591 B2 | 7/2007 | Snyder et al. | |
| 7,337,822 B2 | 3/2008 | Snyder et al. | |
| 7,377,490 B1 | 5/2008 | Khosravian | |
| 7,380,375 B2 | 6/2008 | Maly | |
| 7,841,823 B2 | 11/2010 | Sveum et al. | |
| 8,087,443 B2 | 1/2012 | Snyder et al. | |
| 2002/0170688 A1 | 11/2002 | Daus et al. | |
| 2002/0190849 A1 | 12/2002 | Orzechowski | |
| 2003/0016996 A1 | 1/2003 | Gelfand et al. | |
| 2003/0079845 A1 | 5/2003 | Stern, Jr. | |
| 2003/0111657 A1 | 6/2003 | Green | |
| 2003/0164485 A1* | 9/2003 | Olson | E01F 13/028 256/37 |
| 2005/0098770 A1* | 5/2005 | Schell | E01F 13/028 256/25 |
| 2005/0102041 A1 | 5/2005 | Duvernell et al. | |
| 2005/0211389 A1* | 9/2005 | Snyder | E01F 13/028 160/23.1 |
| 2006/0137261 A1 | 6/2006 | Maly | |
| 2006/0151123 A1 | 7/2006 | Chandler et al. | |
| 2006/0191644 A1 | 8/2006 | Snyder et al. | |
| 2006/0213626 A1 | 9/2006 | Snyder et al. | |
| 2007/0176158 A1* | 8/2007 | Robinson | E01F 13/028 256/12.5 |
| 2007/0284051 A1 | 12/2007 | Grimes et al. | |
| 2008/0124203 A1 | 5/2008 | McDonald | |
| 2009/0008042 A1 | 1/2009 | Snyder et al. | |
| 2010/0146719 A1 | 6/2010 | Swessel et al. | |
| 2010/0181544 A1* | 7/2010 | Wettern | E01F 13/028 160/368.1 |
| 2012/0061032 A1 | 3/2012 | Snyder et al. | |
| 2012/0256149 A1* | 10/2012 | Sylvester | E01F 13/028 256/73 |
| 2013/0291455 A1 | 11/2013 | Wiegel et al. | |

FOREIGN PATENT DOCUMENTS

| | | |
|---|---|---|
| CN | 1956669 | 5/2007 |
| CN | 102718097 A | 10/2012 |
| CN | 105569436 A | 5/2016 |
| EP | 0287510 | 10/1988 |
| JP | H1129912 A | 2/1999 |
| WO | 9713049 | 4/1997 |
| WO | 0209080 | 1/2002 |
| WO | 2005094481 | 10/2005 |

OTHER PUBLICATIONS

Engination, "Rite-Hite Aftermarket Meeting," product brochure showing safety products of JD Metalworks, dated Jul. 9, 2003, 8 pages.

International Searching Authority, "Invitation to Pay Additional Fees and, where applicable, Protest Fee," issued in connection with International PCT application No. PCT/US2020/047441, dated Oct. 28, 2020, 14 pages.

International Searching Authority, "International Search Report and Written Opinion," issued in connection with International PCT application No. PCT/US2020/047441, dated Dec. 21, 2020, 19 pages.

(56) References Cited

OTHER PUBLICATIONS

International Searching Authority, "International Search Report and Written Opinion," issued in connection with PCT application No. PCT/US2020/047441, dated Dec. 21, 2020, 19 pages.

International Searching Authority, "International Preliminary Report on Patentability," issued in connection with PCT application No. PCT/US2020/047441, dated Feb. 17, 2022, 12 pages.

European Patent Office, "Communication Pursuant to Rules 161(1) and 162 EPC," issued in connection with European patent application No. 20767907.7, dated Mar. 29, 2022, 3 pages.

The China National Intellectual Proprety Administation, "First Office Action," issued in connection with Chinese Application No. 202080070526.0, dated Feb. 3, 2023, 22 pages. English Translation Included.

IP Australia, "Examination Report No. 1 For Standard Patent Application," issued in connection with Australian Application No. 2020333960, dated Apr. 12, 2023, 3 pages.

\* cited by examiner

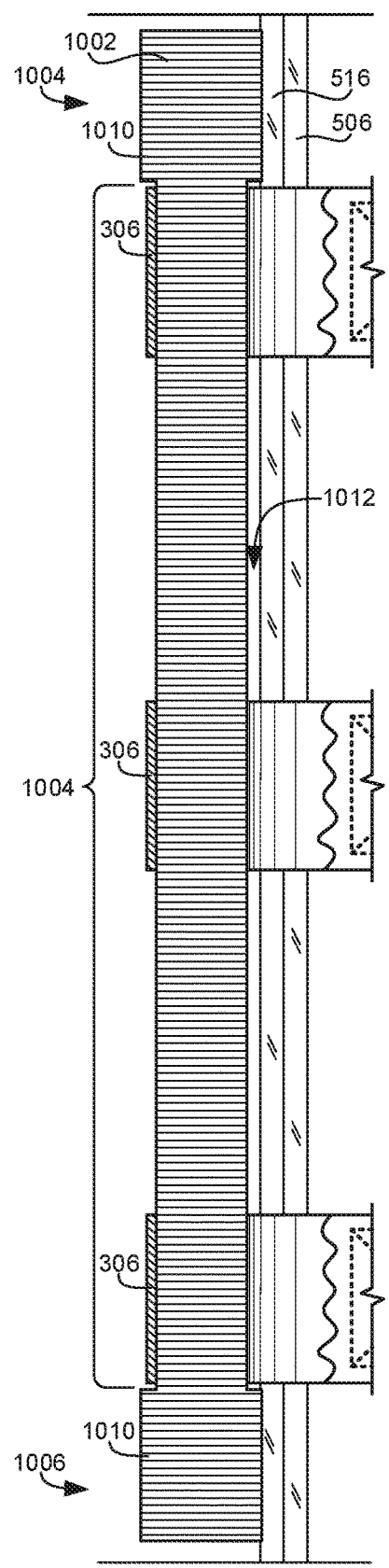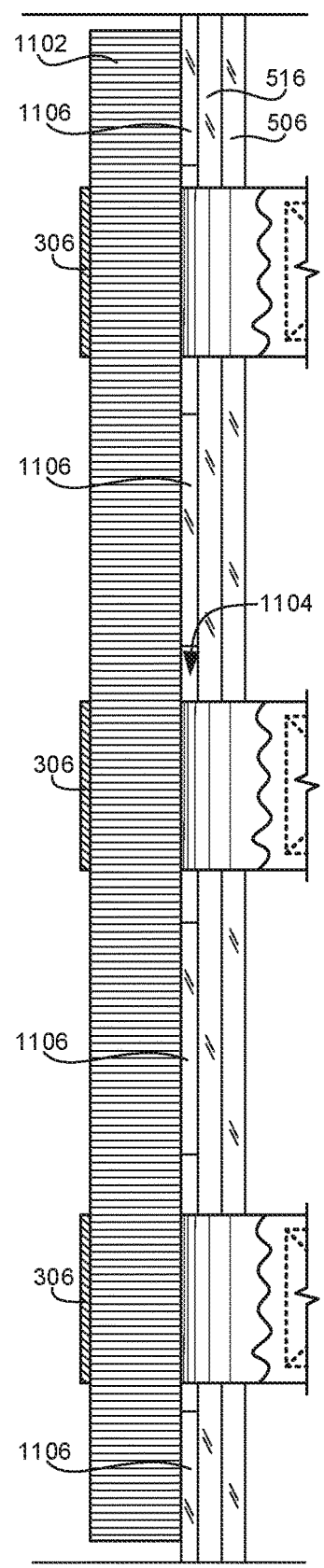
FIG. 10
FIG. 11

IMPACT RESISTANT RETRACTABLE SAFELY BARRIERS

RELATED APPLICATIONS

This patent claims priority to U.S. Provisional Application No. 62/889,974, which was filed on Aug. 21, 2019, and which is incorporated herein by reference in its entirety.

FIELD OF THE DISCLOSURE

This disclosure relates generally to safety barriers, and, more particularly, to impact resistant retractable safety barriers.

BACKGROUND

Many safety barriers have been developed to block traffic (e.g., pedestrians, people in vehicles, equipment, animals, etc.) from passing through a passageway and/or entering certain areas. Some barriers include a panel or curtain that can be extended and retracted/collapsed (e.g., unrolled and rolled) to selectively block a passageway or to open and provide access to the passageway.

BRIEF DESCRIPTION OF THE DRAWINGS

FIG. 10 is a cross-sectional view similar to FIG. 8 but showing a different example stop member.

FIG. 11 is a cross-sectional view similar to FIG. 8 but showing another example stop member.

Figure 1:
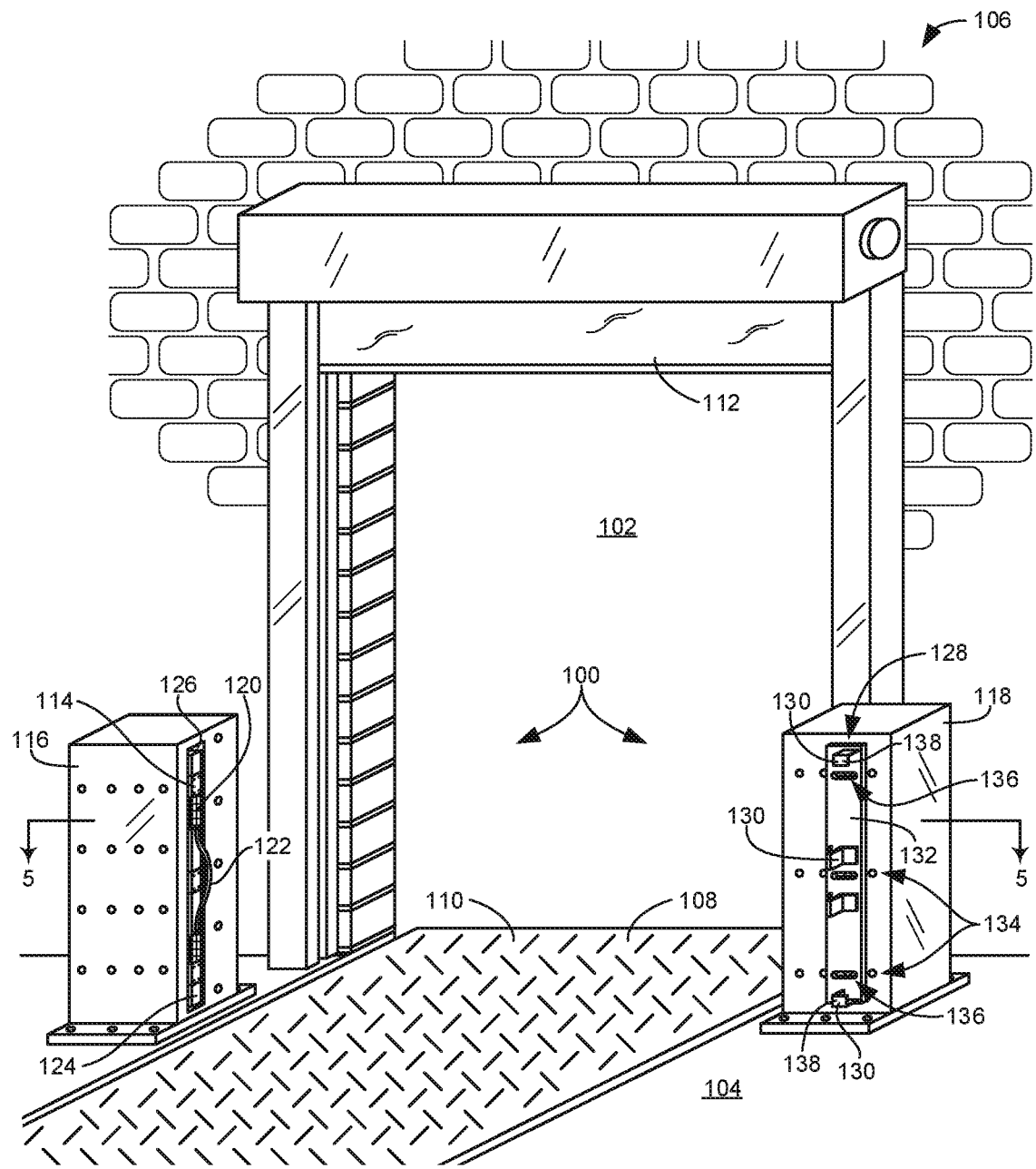
FIG. 1 is a perspective view of an example retractable barrier in a retracted or stored position.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In factories and other industrial environments a forklift and/or other material handling equipment may be used near operating equipment such as machine tools (machining centers, turning centers, etc.). A permanent guardrail may prevent a forklift from striking the machine, but the guardrail may also interfere with material handling equipment loading and unloading the machine of its work pieces.

A retractable barrier may also secure a loading dock opening. A barrier may prevent dockworkers and material handling equipment from falling off the edge of the dock's elevated platform. The platform's height is about the same as that of an average truck bed. Although a door typically exists at the edge of the platform, the door's strength may be insufficient to withstand the impact of a forklift, or the door may be left open for various reasons. With the door open, however, the loading dock platform may create a safety concern.

Although costly, massive safety gates have been used at loading docks, they can take up a lot of space even when they are opened to allow passage through the doorway. Even though they may be able to stop a slowly moving forklift, an impact can cause considerable damage to the gate due to the gate's limited ability to resiliently absorb the impact. Also, permanent or other conventional guardrails and/or other forms of barriers may not be suitable for loading dock areas, as such barriers may interfere with operating the door, loading and unloading trucks, and/or operating a dock leveler that may be installed at the platform.

Figure 2:
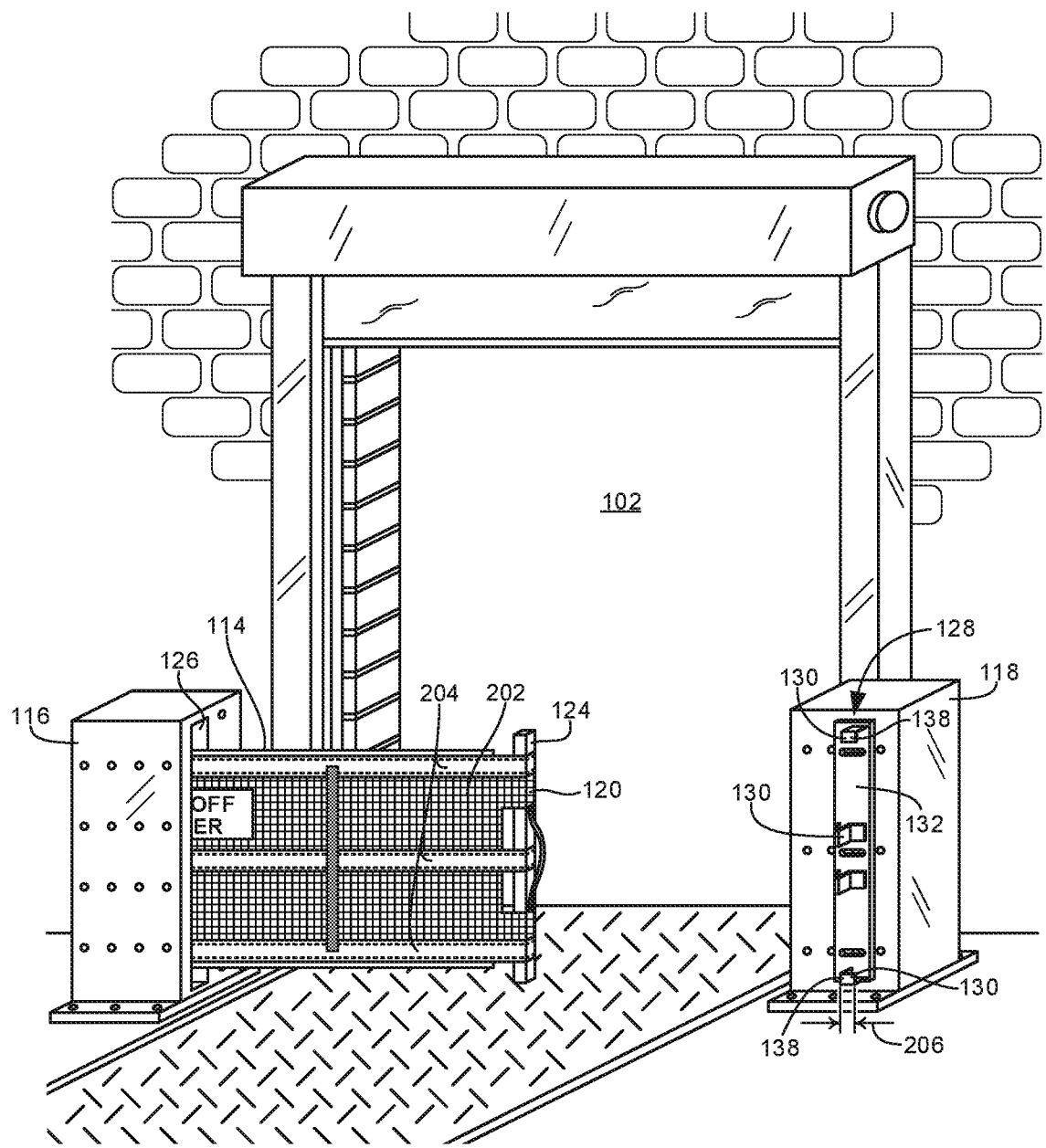
FIG. 2 is a perspective view of the example retractable barrier of FIG. 1 but showing the barrier partially retracted.
Figure 3:
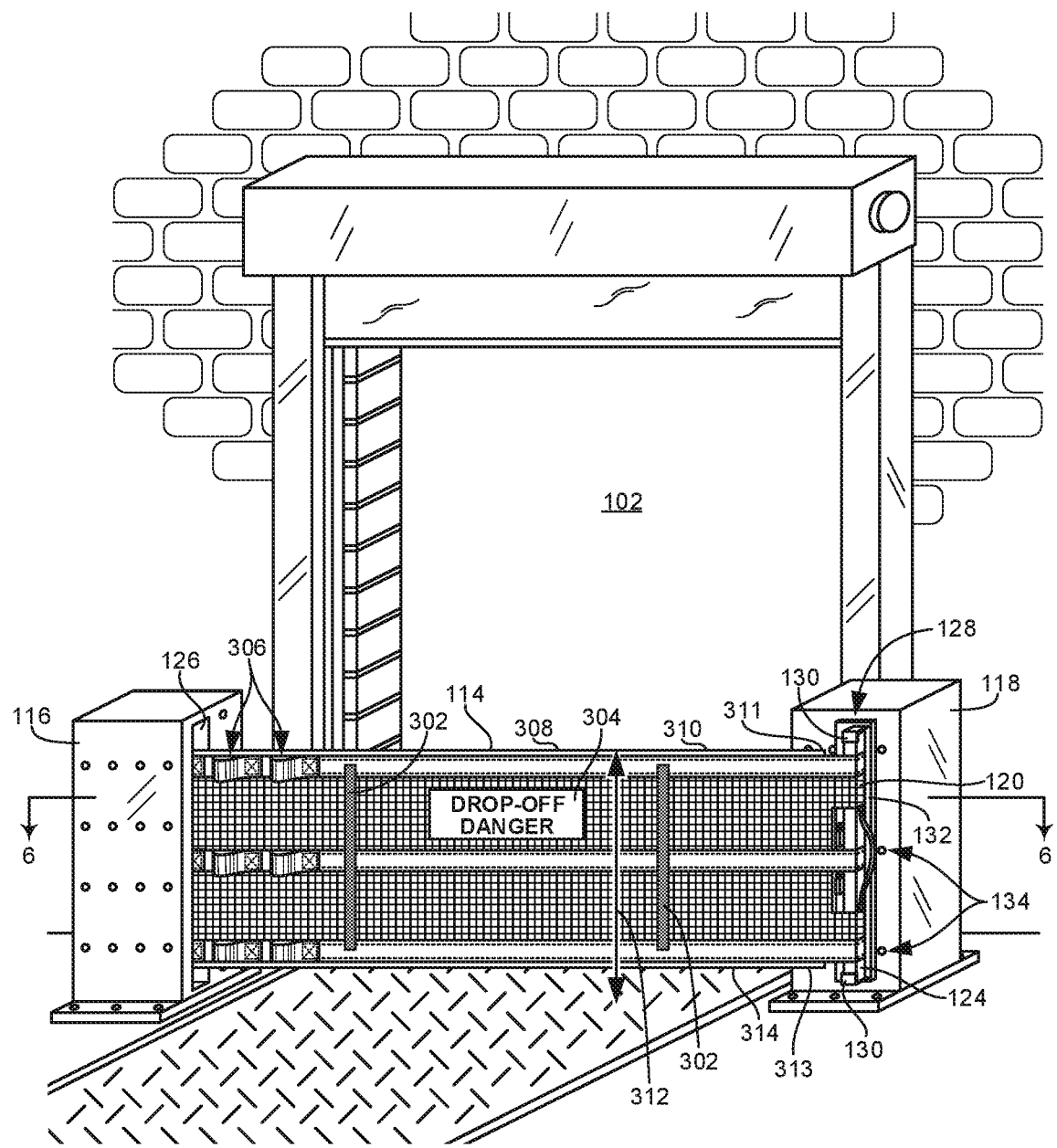
FIG. 3 is a perspective view of the example retractable barrier of FIG. 1 but showing the barrier in an extended or blocking position.

An example retractable safety barrier 100 suitable for heavy duty industrial use is shown in FIGS. 1-3. FIGS. 1-3 show a view from within a building looking out through an open doorway 102. More particularly, FIG. 1 shows the example barrier 100 in an retracted, stored position, FIG. 3 shows the example barrier 100 in an extended, blocking position, and FIG. 2 shows the example barrier 100 partway between its retracted and blocking positions.

While the example barrier 100 is particularly suited for installation on an elevated platform 104 of a loading dock 106, the barrier 100 can be readily applied to a broad range of heavy and/or light duty applications including guarding machinery, guarding construction sites, restricting vehicular and/or pedestrian traffic, restraining cargo, restraining stock stored on high pallet racks, etc. However, for purposes of explanation, the barrier 100 will be described with reference to its installation at the loading dock 106.

The loading dock 106 may include a dock leveler 108 with a pivotal deck 110 that is shown in the illustrated example in a cross-traffic position with the top surface of deck 110 generally flush with the platform 104. In the illustrated example, the dock 106 also includes a door 112 that can provide access to the cargo space of a truck (e.g., trailer, container, etc.) parked at the dock. When a truck is not present, the door 112 is normally closed and the need for the barrier 100 may not be apparent. However, the strength of door 112 may be insufficient to withstand the impact of a forklift such that the barrier 100 may be useful even when the door 112 is closed. Further, in some cases, the door 112 may be left open, as shown in the illustrated example, even though no truck is present to, for example, help ventilate the building.

Whether the door 112 is open or closed while no truck is present at the dock 106, the platform 104 may create a falling hazard. In particular, a dockworker and/or material-handling equipment, such as a forklift, may accidentally travel off the edge of platform 104 and fall onto the driveway just beyond doorway 102. To reduce the likelihood of such accidents, some type of barrier could be installed across the doorway. The barrier, however, would need to be movable to permit loading and/or unloading of a truck at the dock, not interfere with the operation of the door, permit the operation of the dock leveler, and not obstruct traffic in the vicinity of the dock.

To accomplish these objectives, the example barrier 100 includes a retractable panel 114 that can selectively extend and retract between a first support member 116 and a second support member 118. The support members 116, 118 may be attached to the floor of the platform 104, attached to the wall of the building surrounding the doorway 102, and/or connected to adjacent structure (e.g., a doorway frame, door guide, etc.). In some examples, the support members 116, 118 are anchored to the floor and otherwise self-supporting. In some examples, the support members 116, 118 are fixed or anchored to one or more other structural members besides the floor, such as a wall adjacent the door opening. In some examples, the support members 116, 118 may be referred to as a "post," wherein the term "post" refers to a member whose primary source of support comes from the floor.

In some examples, the retractable panel 114 is housed within one of the support members (e.g., the first support member 116) when the example barrier 100 is in the retracted, stored position. More particularly, in some examples, the retractable panel 114 includes a pliable material that enables the panel 114 to be rolled up when retracted (e.g., wrapped around a roller or other take-up member). In other examples, the panel 114 may retract by being folded up or otherwise collapsing (e.g., translating separate interconnected sections).

In some examples, the panel 114 is moved from a stored, retracted position to an extended, blocking position by pulling the panel 114 out from within first support member 116 and coupling a distal end 120 of the panel 114 to the second support member 118, as shown in the FIG. 3. The panel 114 in such a position provides a barrier that helps prevent people and/or vehicles from accidentally falling off the edge of the platform 104. By returning the panel 114 to its stored position within the first support member, as shown in FIG. 1, the barrier 100 permits normal operation of the loading dock 106—loading or unloading of cargo from a truck at the dock.

In some examples, movement of the panel 114 to the extended position is facilitated by a handle 122 attached to a bar 124 at the distal end 120 of the panel. In some examples, the handle may be a pliable strap. In other examples, the handle may be a rigid bar separate from the primary bar 124 defining the distal end 120 of the panel 114. In still other examples, the handle may include a rigid member (e.g., bar, pipe) that is pivotably coupled to the primary bar 124 such that it lies generally parallel to the primary bar 124 when not in use, but can be rotated up about 90 degrees to a point in which it is generally horizontal and perpendicular to the direction of movement of the panel 114 between the first and second support members 116, 118 to enable ergonomic movement of the panel 114. In some examples, when the panel 114 is in the stored position within the first support member 116, the bar 124 may be stowed within a pocket 126 so as not to interfere with nearby traffic.

In some examples, the distal end 120 of the panel 114 is structured to be received by a hook assembly 128 associated with the second support member 118 as shown in the illustrated example of FIG. 3. Specifically, in the illustrated example, the hook assembly 128 includes one or more hooks or brackets 130, which are welded to a mounting plate 132, which in turn is bolted or otherwise affixed to the main section of the second support member 118. In some examples, the second support member 118 includes a plurality of mounting holes 134 to adjust the position of the mounting plate 132, thereby adjusting the distance over which the panel 114 must extend from the first support member 116 to be retained by the hook assembly 128.

Further, in some examples, the mounting plate 132 includes elongate slots 136 that enable the mounting plate 132 to be adjustably positioned in the horizontal direction relative to a particular one of the mounting holes 134 along a range defined by the length of the slots 136, thereby enabling the precise positioning of the mounting plate 132. Additionally or alternatively, in some examples, the second support member 118 may include elongate slots instead of the holes 134 to facilitate the same functionality as the elongate slots 136 shown in the mounting plate 132 in the illustrated example. The precise placement of the mounting plate 132 serves to precisely position the bar 124 to reduce (e.g., minimize) slack in the panel 114 when in the extended or blocking position as shown in FIG. 3 while still enabling the bar 124 to latch to and unlatch from the hooks or brackets 130 (e.g., to clear or pass a lip 138 included on one or more of the brackets 130) when securing or removing the panel 114 from the second support member 118. In some examples, the lip 138 has a width 206 (FIG. 2) that is at least 50% the thickness of the bar 124 to ensure the bar 124 is held in place without falling off the hooks 130. Further, in some examples, the width 206 of the lip 138 is no more than 100% of the thickness of the bar 124 so that the bar 124 does not need to extend a significant extent beyond the inside surface of the hooks 130 to latch into place, thereby reducing the amount of slack in the panel 114 when it is extended in the blocking position. The thickness of the bar 124 may be any suitable thickness (e.g., 3 inches, 2 inches, 1.5 inches, 1 inch, etc.). In some examples, the hooks 130 may be mounted directly to the main section of the second support member 118 without the plate 132.

As shown in the illustrated examples of FIGS. 2 and 3, the panel 114 includes a fabric web or mesh 202 reinforced by one or more straps 204 or another flexible elongate member. In some examples, both the web 202 and the straps are made of pliable material so that the panel 114 may be repeatedly retracted and extended. In some examples, the straps 204 are made of nylon and/or some other high-test belting material. In some examples, the straps 204 are coupled to the bar 124 by screws passing through the straps 204 and into the bar 124. In some examples, one or more stays 302 may be attached the panel 114 to provide greater vertical support and/or rigidity between different ones of the straps 204. In some examples, the fabric web 202 and the straps 204 wrap around the bar 124 at the distal end 120 of the panel 114. In other examples, the fabric web 202 may not wrap around the bar 124 and may remain spaced apart from the bar 124. In some such examples, the straps 204 are nevertheless wrapped around the bar 124 to enable impact forces received by the straps 204 to be transferred to the bar 124 and then transferred to the second support member 118 as described further below in connection with FIGS. 5-7. In some examples, the straps 204 also include one or more sleeves 306 near a proximal end of the panel 114 to hold a stop member that transfers impact forces received by the straps 204 to the first support member 116 as described further below in connection with FIGS. 5-7. In some examples, the sleeves 306 are formed of the same material as the straps 204. In some examples, the sleeves 306 (or at least the sleeves closest to the proximal end of the panel 114) are integrally formed out of an end of the corresponding straps 204.

In some examples, to warn others in the area of the dock 106 that a drop-off hazard may exist, even when the door 112 is closed, the panel 114 may include contrasting colors (e.g., red and yellow, black and yellow, etc.). More particularly, in some examples, the straps 204 are yellow and the fabric web 202 is red. Additionally or alternatively, in some examples, a warning label 304 is prominently displayed on the panel 114 to indicate that a safety hazard exists.

In some examples, an upper edge 308 of the panel 114 includes a cord 310 attached thereto. The cord 310 may be formed of any suitable material (e.g., keder cord). The cord 310 may be attached to the panel in any suitable manner. In some examples, the cord is stitched or sewn to the uppermost strap 204 on the panel. In some such examples, the cord 310 extends the full length of the strap 204 and wraps around the bar 124 and/or the stop member 520 (FIGS. 5-11). In other examples, as shown in FIG. 3, the cord 310 may span the full distance between the support members 116, 118 when the barrier 100 is extended, but have an end 311 that is spaced apart from the bar 124 and/or the stop member 520. In some examples, the cord 310 has a generally circular cross-section. However, the cord may have any suitable cross-sectional shape (e.g., oval, square, etc.). In some examples, the cord 310 has a thickness (e.g., diameter) of at least 0.25 inches and may be as large as at least 1 inch or even larger (e.g., up to 3 inches). The cord 310 provides a structure that a person may grab onto as a handrail when adjacent the extended barrier 100. In some examples, the cord 310 is dimensioned and positioned to meet the requirements for handrails outlined in Occupational Safety and Health Administration (OSHA) Standards. Further, in some examples, the length of the panel 114 between the stop member 520 and the bar 124 is dimensioned relative to the spacing between the first and second support members 116, 118 to reduce (e.g., minimize) the slack in the panel 114 when in the extended or blocking position as shown in FIG. 3 and, therefore, reduce (e.g., minimize) any deflection in the panel 114 when subject to an impact force 702 (FIG. 7). Independent of deflection in the direction of an impact (e.g., transverse to the panel 114), in some examples, the panel 114 and support members 116, 118 are constructed and spaced so that the amount of deflection of the cord 310 or the top edge of the panel 114 in the downward direction (e.g., parallel to the panel 114) is maintained below a threshold level for a given load defined by OSHA standards (e.g., maintain a height 312 (even when deflected) of at least 39 inches from the walking surface when subject to a 200 pound force, given an undeflected height between 39 and 45 inches). As described above, the elongate slots 136 in the mounting plate 132 help to precisely position the hooks or brackets 130 that retain the bar 124 so that any slack and, thus, any corresponding deflection, in the panel 114 and/or cord 310 is reduced (e.g., minimized).

In some examples, any flexible elongate component formed of one or more material(s) other than a cord (e.g., a layered or rolled section of strap material) could additionally or alternatively be used to provide added thickness (e.g., of at least 0.25 inches) at the upper edge 308 of the panel to provide the functionality of a handrail. In some examples, a second cord 313 (or other flexible elongate component) is positioned along a lower edge 314 of the panel 114. Placing the separate cords 310, 313 on both edges 308, 314 of the panel 114 enables the panel to be inverted with either edge 308, 314 on top while remaining fully functional. While the cords 310, 313 in the illustrated example of FIG. 3 are shown on the upper and lower edges 308, 314 of the panel 114, in some examples, a cord may additionally or alternatively be attached to the panel 114 at any suitable height between the upper and lower edges 308, 314.

Furthermore, independent of their utility as a handrail, the thickness of the cords 310, 313 (or other elongate component of suitable thickness) serves to facilitate even rolling of the panel 114 about an axis (e.g., about a roller) within the first support member 116 when being retracted and placed in the stored position. More particularly, the different thicknesses of the web 202 and the straps 204, as well as the presence (e.g., thickness, weight) of the stays 302, the warning label 304, the stop member 520, and/or the sleeves 306, can result in uneven bunching of the panel 114 as it is wrapped around a roller within the first support member 116 when the barrier 100 is placed in the retracted, stored position. In some examples, the cords 310, 313 add additional thickness to the panel 114 at its upper and lower edges 308, 314 with area of the panel 114 between the edges being significantly thinner. For instance, in some examples, the combined width of the straps 204 and the web 202 may be less than or equal to approximately 0.125 inches, whereas the thickness of the cords 310, 313 are at least twice as thick (e.g., at least 0.25 inches). In other examples, the combined thickness of the straps 204 and the web 202 is greater than 0.125 inches but less than 0.25 inches. Constructing the panel 114 in this manner helps to reduce the effects of uneven bunching caused by the different components of the panel 114 when being wrapped around a roller. Furthermore, constructing the panel 114 to be thickest at the upper and lower edges 308, 314 results in successive wraps of the panel 114 about a roller to be thicker at the upper and lower extremities of the of panel, which helps maintain the panel 114 at a consistent position relative to the roller during subsequent wraps of the panel about the roller.

Figure 4:
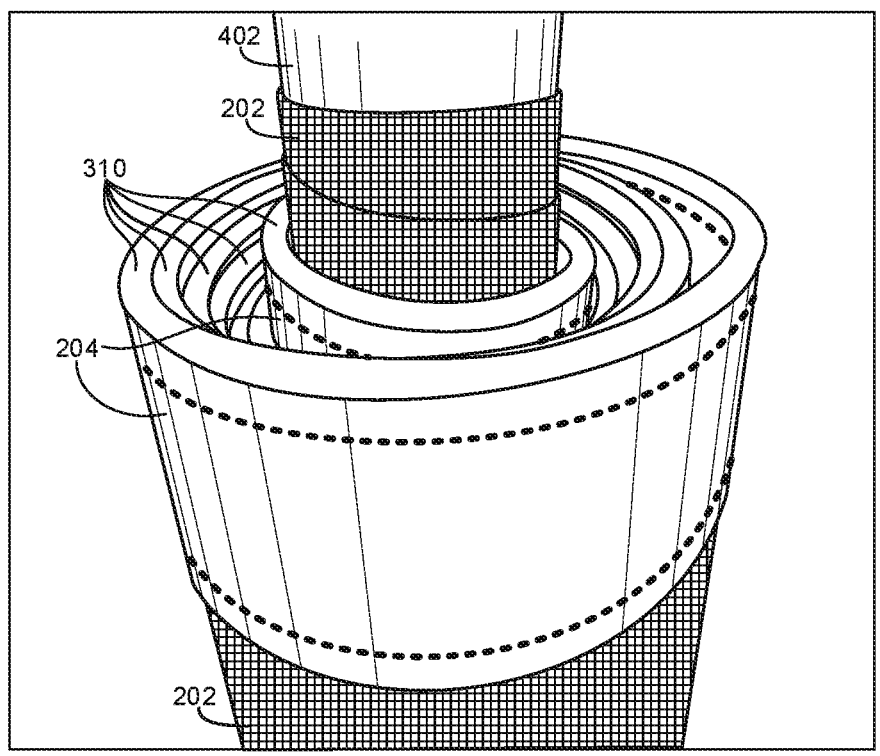
FIG. 4 shows the panel of the example retractable barrier of FIGS. 1-3 wrapped around a roller 402 when the barrier is in the retracted or stored position.

The illustrated example of FIG. 4 shows the panel 114 wrapped around a roller 402. As shown in the illustrated example, different wraps of the panel 114 around the roller 402 are at substantially consistent heights (e.g., within 1 inch of each other and may even be within 0.5 inches of each other) along the elongate length of the roller 402. Wrapping the panel 114 around the roller in this manner has been found to facilitate the smooth wrapping of the panel 114 about the roller 402 despite the presence of the different components of the panel 114 (e.g., web 202, the straps 204, the stays 302, the warning label 304, the stop member 520, the sleeves 306, etc.).

Figure 5:
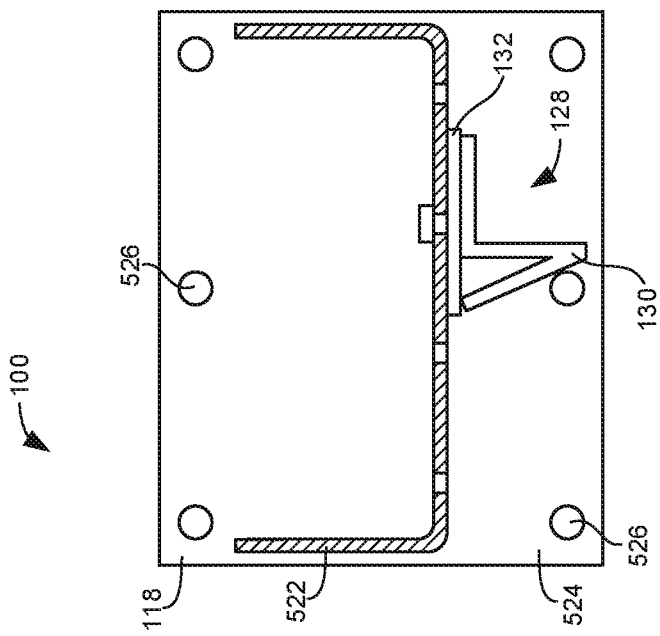
FIG. 5 is a cross-sectional view taken along line 5-5 of FIG. 1.
Figure 5:
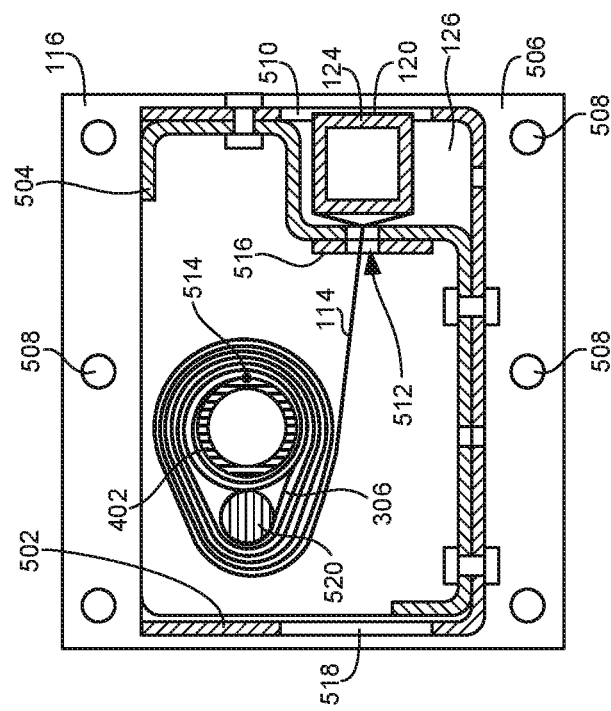
Figure 6:
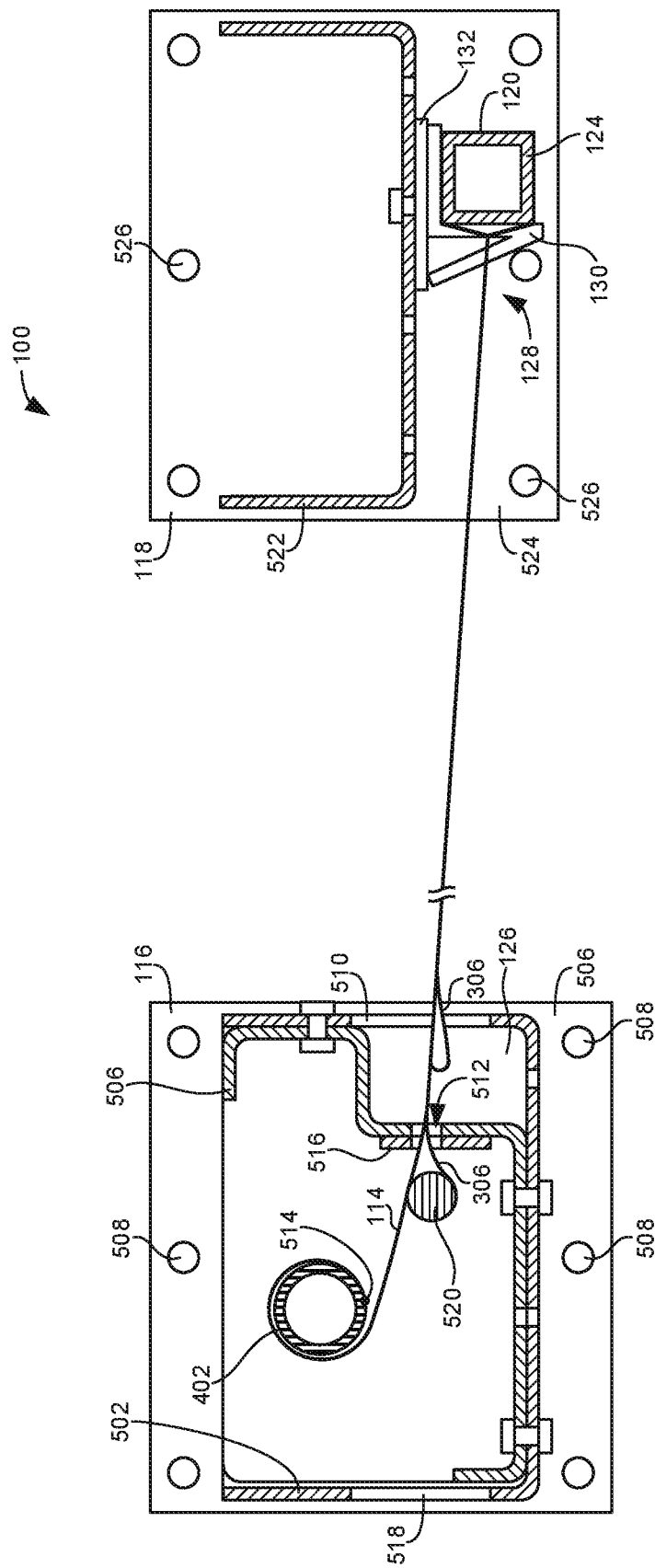
FIG. 6 is a cross-sectional view taken along line 6-6 of FIG. 3.
Figure 7:
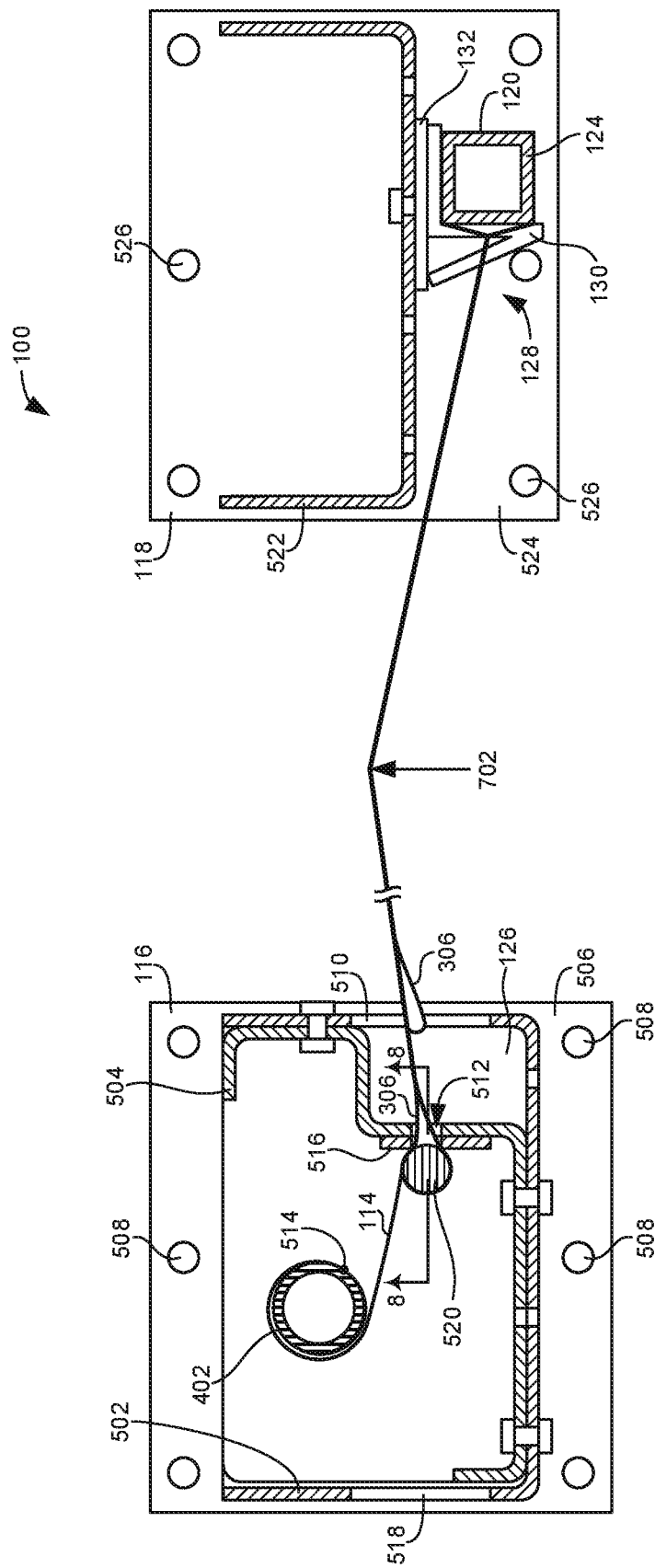
FIG. 7 is a cross-sectional view similar to FIG. 6 but showing the example barrier during an impact.

FIGS. 5-7 show cross-sectional views of the example barrier 100 of FIG. 103. In particular, FIG. 5 is a cross-sectional view taken along line 5-5 of FIG. 1 when the example barrier 100 is in the open or retracted position. FIG. 6 is a cross-sectional view taken along line 6-6 of FIG. 3 when the example barrier 100 is in the extended or blocking position. FIG. 7 is a cross-sectional view similar to FIG. 5 but showing the example barrier during an impact.

As shown in the illustrated examples, the first support member 116 includes an outer housing 502 and an inner frame 504 vertically extending between a base plate 506 and a top plate (omitted in the cross-sectional views of FIGS. 5-7). In some examples, the base plate 506 includes holes 508 to anchor the first support member 116 to the floor. The first support member 116 is structured to support the roller 402 about which the panel 114 is wrapped when retracted and stored within the first support member 116 as shown in FIG. 5. In some examples, the outer housing 502 and the inner frame 504 are structured to define the pocket 126 within which the bar 124 may be stored when the panel 114 is retracted and wrapped around the roller 402 in the stored position. More particularly, as shown in the illustrated example, the outer housing 502 includes an opening 510 that provides entry into the pocket 126 with the inner walls of the pocket defined by the inner frame 504. In some such examples, the inner frame 504 includes a slot 512 in the inner wall of the pocket 126 to enable the panel 114 to pass therethrough so that a proximal end 514 of the panel may be connected to the roller 402. That is, in some examples, the slot 512 is dimensioned to be wider than the thickness of the web 202, the straps 204, the stays 302, the warning label 304, the sleeves 306, and/or the cords 310, 313. However, in some examples, the slot 512 is sufficiently narrow to prevent the bar 124 at the distal end 120 of the panel 114 from passing therethrough.

In some examples, an additional slot support member 516 is attached to the inner frame 504 to provide additional support around the slot 512. In some examples, the slot support member 516 may be omitted or integrated with the inner frame 504. Although each of the outer housing 502 and the inner frame 504 are shown as separate single pieces of material, in some examples, the outer housing 503 and/or the inner frame 504 may be formed from multiple separate pieces. In some examples, the outer housing 502 and inner frame 504 are formed separately to enable the inner frame 504 to be inverted within the outer housing 502 to create a pocket on the other side of the housing 502 associated with a separate opening 518 opposite the opening 510 associated with the pocket 126 shown in the illustrated examples. In this matter, the panel 114 may be configured to extend to either the left or right of the first support member 116.

In some examples, the roller 402 is associated with a retracting mechanism (e.g., torsion spring) to urge the roller 402 to draw the panel 114 into the first support member 116 toward the stored or retracted position. Thus, in some examples, when the panel 114 is extended such that the bar 124 is retained by the hooks or brackets 130 of the hook assembly 128, as shown in FIG. 6, the retracting mechanism urges the bar 124 against the hooks 130. Further, in some examples, when the bar 124 is removed from the hook assembly 128, the retracting mechanism causes the panel 114 to be drawn into the first support member 116 (e.g., through the opening 510 and slot 512) as the panel wraps around the roller 402 until the bar 124 is stored within the pocket 126 as shown in FIG. 5.

In some examples, the panel 114 may be subject to an impact force 702, as shown in FIG. 7, when the panel is extended between the support members 116, 118. In some examples, the impact force 702 is transferred to the second support member 118 as the bar 124 is urged against the hooks 130 in response to the impact force. In some examples, the bar 124 is vertically elongate to evenly distribute impact force 702 from the vertical span of panel 114 substantially across the vertical span of the second support member 118. In some examples, the impact force 702 is also transferred to the first support member 116 by stop member 520 carried by the panel 114. Specifically, in some examples, the stop member 520 is attached to the panel 114 at a position within the first support member 116 and just inside (e.g., within less than two inches of) the slot 512 when the panel 114 is extended to the blocking position as shown in FIG. 6. The stop member 520 may be pipe, bar, or other structure that is dimensioned to be thicker than the slot 512. As a result, when the panel 114 receives an impact force, rather than the force pulling the panel out of the first stop member and/or damaging the roller 402 and/or the associated retracting mechanism, the stop member 520 will be urged against the structure surrounding the slot 512 (e.g., the slot support member 516), thereby transferring the impact force 702 to the first support member 116.

As noted above, in some examples, the length of the panel 114 extending from the stop member 520 to the bar 124 is greater than the distance between a first point of engagement (where the stop member 520 is urged against the slot 512 of the first support member 116 when a force is applied to the panel 114 (e.g., during an impact)) and a second point of engagement (where the bar 124 is urged against the inside surface of the hooks or brackets 130 on the second support member 118). However, in some examples, the difference between the length of the panel 114 extending between the stop member 520 and the bar 124 and the distance between the first and second points of engagement is relatively small. More particularly, in some examples, the difference approximately corresponds to the width 206 of the lip 138 of the brackets 130 such that the difference is large enough to enable the bar 124 to be latched onto the hooks 130 (e.g., to be able to clear the lip 138 for positioning against the inside surface of the hooks 130) but small enough to reduce (e.g., minimize) an amount of deflection in the panel 114 and/or the cord 310 when subject to a force, thereby satisfying OSHA requirements as mentioned above. As mentioned above, in some examples, the width 206 of the lip 138 is between 50% and 100% the thickness of the bar 124. Therefore, in some examples, the difference between the distance from the stop member 520 to the bar 124 on the one hand and the distance from the two points of engagement on the other hand ranges from 50% to 100% of the thickness of the bar 124. In some examples, the difference may significantly less than 50% of the thickness of the bar (e.g., approximately zero). In some such examples, both the stop member 520 and the bar 124 engage the respective first and second points of engagement during normal operation without any external force (e.g., an impact force) applied to the panel 114. In such examples, the panel 114 is held substantially taut between the stop member 520 and the bar 124 as both are urged against (or at least in contact with) the respective first and second points of engagement. In some such examples, the bar 124 is able to clear or pass the lip 138 of the hooks 130 by selectively moving the hooks 130 relative to the second support member 118.

The panel 114 may stretch over time after repeated use, thereby resulting in an increase in slack in the panel 114 and/or the cord 310. However, in some examples, as described above, the mounting plate 132 may be adjusted relative to the second support member 118 via the elongate slots 136 so as to keep the panel 114 and/or the cord 310 relatively taut and maintain the amount of deflection within a desired threshold. Furthermore, the difference between the spacing of the stop member 520 and the bar 124 on the one hand and the spacing of the first and second points of engagement on the other hand also enables the stop member 520 to be spaced apart from the slot 512 when the panel is not subject to a force as shown in FIG. 6. In some examples, this spacing prevents the sleeves 306 and/or the straps 204, which surround the stop member 520, from contacting the slot 512, thereby reducing (e.g., avoiding) wear on the sleeves 306 or straps 204 when the panel 114 is not subject to an impact. This spacing is facilitated or maintained in some examples by the retracting mechanism associated with the roller 402.

In some examples, the stop member 520 is vertically elongate to extend substantially the full distance between the upper and lower edges 308, 314 of the panel 114 to facilitate the even distribution of forces from the vertical span (i.e., height) of the panel 114 substantially across the vertical span of the first support member 116. For instance, in some examples, the stop member 520 is positioned to extend through corresponding ones of the sleeves 306. In some examples, the stop member 520 is secured to the sleeves 306 via any suitable means (e.g., a screw that extends through the sleeves 306 and into the stop member 520). In some examples, multiple different sleeves 306 are positioned at different places along the length of the panel 114 (as shown in FIG. 3) to adjust the length of the panel 114 to be used in conjunction with doorways with different widths. In some examples, the horizontal spacing between adjacent sleeves 306 enables the length of barrier 100 to be adjusted in discrete increments equal to the spacing of the sleeves 306.

In some such examples, finer length adjustments for the barrier 100 are achieved by changing where the mounting plate 132 of the hook assembly 128 is attached to the second support member 118. More particularly, as shown in the illustrated examples, the second support member 118 includes a vertical frame 522 that includes the plurality of mounting holes 134 to which the hook assembly 128 may be fastened. The vertical frame 522 is supported by a base plate 524 that includes holes 526 to anchor the second support member 118 to the floor.

As mentioned above, in some examples, the inner frame 504 of the first support member 116 may be inverted to enable the panel 114 to extend to the left rather than to the right as shown in the illustrated examples. In such examples, the second support member 118 may be arranged to receive the bar 124 at the distal end 120 of the panel 114 by inverting the hook assembly 128 and so that the hooks 130 are facing the opposite direction.

For purposes of illustration, the stop member 520 is shown to be solid with a circular cross-section while the bar 124 at the distal end 120 of the panel 114 is shown to be hollow with a square cross-section. In other examples, either of the stop member 520 or the bar 124 may have a circular cross-section, a square cross-section, and/or any other suitable cross-section. Further, in some examples, either the stop member 520 or the bar 124 may be hollow or solid.

Figure 8:
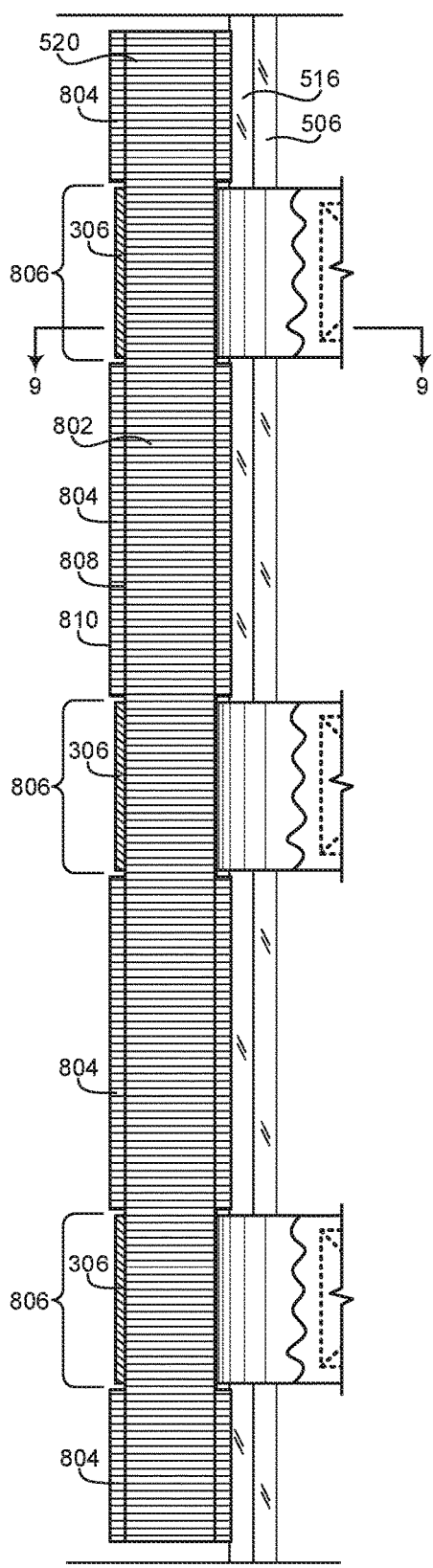
FIG. 8 is a cross-sectional view taken along line 8-8 of FIG. 7.
Figure 9:
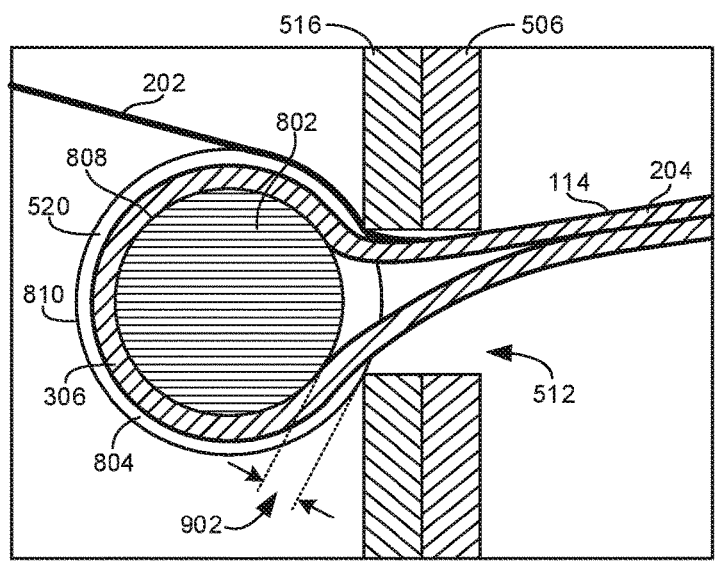
FIG. 9 is a cross-sectional view taken along line 9-9 of FIG. 8.

FIG. 8 is a cross-sectional view of the stop member 520 taken along line 8-8 of FIG. 7 corresponding to when the stop member 520 is urged against the slot 512 defined by the inner frame 504 and the slot support member 516. For purposes of explanation, the web 202 of the panel 114 has been omitted in FIG. 8. FIG. 9 is a cross-sectional view taken along line 9-9 of FIG. 8. As shown in the illustrated example, the stop member 520 includes an elongate core 802 and a plurality of radially protruding segments 804 distributed along the length of the core 802. More particularly, as shown in the illustrated example of FIG. 8, the radially protruding segments 804 are positioned to be spaced apart from regions 806 where the sleeves 306 wrap around and interface with the stop member 520. In other words, the radially protruding segments 804 are positioned at locations along the axis of the core 802 where the sleeves 306 are not positioned. As a result, the sleeves 306 directly interface with an inset surface 808 corresponding to the outer surface of the core 802 that is within (at a reduced diameter of) a protruding surface 810 corresponding to the outer surface of the protruding segments 804. In the illustrated example, there are four separate protruding segments 804 positioned between the sleeves 306 and at upper and lower ends of the elongate core 802. However, in other examples, there may any number of protruding segments 804, which may be more or less than the four shown in the illustrated example (e.g., 1, 2, 3, 5, 6, etc.), and which may be positioned at any suitable location(s) along the core 802. In some examples, the particular number of protruding segments 804 and their corresponding location(s) may depend upon the number of straps 204 used and the associated location(s) of the straps (and corresponding sleeves 306). Additionally, the radially protruding segments 804 can physically maintain the axial position of the sleeves 306 relative to the stop member 520.

In some examples, the distance between the inset surface 808 and the protruding surface 810 (e.g., the thickness of the protruding segment along the outer surface of the core 802) is equal to or greater than the thickness of the sleeves 306. As a result, when the stop member 520 is urged against the slot support member 516, the protruding surface 810 contacts the slot support member 516 and leaves a gap 902 (FIG. 9) between the slot support member 516 and the inset surface 808 of the core 802 with a width of the gap 902 being equal to or greater than the thickness of the sleeve 306. This arrangement prevents the sleeve 306 from being pinched between the stop member 520 and the slot support member 516, thereby reducing damage and/or wear to the sleeve 306, which is critical to the curtain's ability to withstand the force of an impact. Furthermore, in some examples, the relative sizes of the loop of the sleeve 306 surrounding the core 802, the width of the core 802, the width of the protruding segments 804, and/or the width of the slot 512 may be constructed such that the sleeve 306 and associated strap 204 do not touch or otherwise directly contact the base plate 506, the slot support member 516 (if included), and/or, more generally, any portion of the first support member 116 along the height of the panel 114 adjacent the stop member 520 when the panel 114 is in a normal position extended between the support members 116, 118 (e.g., as shown in FIG. 6). Furthermore, in some examples, the sleeve 306 and associated strap 204 may not touch or otherwise directly contact the first support member 116 along the height of the panel 114 adjacent the stop member 520 even when the panel 114 is subject to an impact causing the panel to deflect as shown in FIGS. 7 and 9.

As shown in the illustrated example, the thickness of the sleeves 306 corresponds to the thickness of the straps 204 because the sleeves are integrally formed using the end of the straps 204. Therefore, in some examples, the width of the shoulder between the inset surface 808 and the protruding surface 810 is equal to or greater than the thickness of the straps 204. Inasmuch as the sleeves 306 are formed from the end of the straps 204 in this example, only the web 202 extends beyond the stop member 520 towards the roller 402, as shown in the illustrated example of FIG. 9. Alternatively, the straps can be sewn onto themselves to form a loop encircling the stop member 520 enabling the ends to be secured to the roller.

While the inset regions 806 help to avoid damage to the sleeves 306 (and/or the associated straps 204), the web 202 may still get pinched between the stop member 520 and the slot support member 516 because the web 202 extends between the different straps 204 across the regions of the stop member 520 associated with the protruding segments 804. Pinching of the web 202 is of less concern than pinching of the straps 204 because the straps 204 are the primary materials of the panel 114 used to absorb the impact force 702 and transfer it to the support members 116, 118 (e.g., the straps 204 are load bearing materials whereas the web 202 is not load bearing). However, in some examples, to avoid wear on the web 202 caused by the stop member 520 being forced against the slot support member 516, the protruding segments 804 between the different sleeves 306 may be omitted such that only the upper and lower ends of the stop member 520 include protrusions as shown in the illustrated example of FIG. 10. That is, FIG. 10 shows another example stop member 1002 with a single inset region 1004 that extends substantially the full length of the stop member 1002 except at the upper and lower ends 1006, 1008 where protrusions 1010 extend radially outward from the surface of the inset region by a distance equal to or greater than the thickness of the sleeves 306. In this arrangement, contact between the outer surface of the protrusions 1010 and the slot support member 516 results in a gap 1012 along the length of the inset region 1004 sufficient to prevent the sleeves 306 (and/or associated straps 204) as well as the web 202 (not shown in FIG. 10 for the sake of clarity) from being pinched when the barrier 100 is subject to an impact. As with FIG. 8, the web 202 of the panel 114 has been omitted in FIG. 10 for the sake of clarity.

For purposes of illustration, the protrusions 1010 in FIG. 10 are shown as being integrally formed with the rest of the stop member 1002. By contrast, the protruding segments 804 in FIG. 8 are separate parts that are affixed to the core 802 of the stop member 520 using any suitable means (e.g., threading, welding, adhesives, etc.). Of course, in other examples, the protruding segments 804 could be integrally formed with the core 802 in FIG. 8 and the protrusions 1010 in FIG. 10 could be separate parts to the rest of the stop member 1002 of FIG. 10. Additionally, as with the protruding segments 804 of FIG. 8, there may be any suitable number of protrusions 1010 greater or less than the two shown in the illustrated example (e.g., 1, 3, 4, 5, etc.) and such protrusions 1010 may be positioned at any suitable location(s) along the stop member 1002. In some examples, the particular number of protrusions 1010 and their corresponding location(s) may depend upon the number of straps 204 used and the associated location(s) of the straps (and corresponding sleeves 306). Further, although the protruding segments 804 of FIG. 9 and the protrusions 1010 of FIG. 10 are illustrated as extending all the way around the circumference of the corresponding stop members 520, 1002, in other examples, the protruding segments 804 and the protrusions 1010 may extend only part way around the stop members. In such examples, the protruding segments 804 and the protrusions 1010 may be of any suitable shape and positioned to face toward the slot support member 516 to ensure the gaps 902, 1012 are maintained during an impact. Further, protruding segments 804 could be formed of impact absorbing, resiliently deformable material (e.g., synthetic or natural polymeric material).

FIG. 11 illustrates another example stop member 1102 that does not include any protrusions along its length but has a consistent profile along its entire length. In some such examples, a gap 1104 between the stop member 1102 and the slot support member 516 is achieved by including spacers or protrusions 1106 on the surface of the slot support member 516 at discrete locations spaced apart from where the sleeves 306, or the panel in its entirety, interface with (e.g., wrap around) the stop member 1102 as shown in FIG. 11. In some examples, the spacers 1106 may be positioned near the upper and lower ends of stop member 1102 but not between different ones of the sleeves 306 in a similar manner to that shown in FIG. 10. In some examples, the protruding segments 804, protrusions 1010, and/or the spacers 1106 may be positioned between the sleeves 306 near the middle of the stop member 1102 and omitted at the upper and lower ends of the stop member 1102. Further, although four spacers 1106 are shown in FIG. 11, any suitable number of spacers 1106 may be included (e.g., 1, 2, 3, 5, 6, etc.) at any suitable location(s) along the slot member 1102. In some examples, the particular number of spacers 1106 and their corresponding location(s) may depend upon the number of straps 204 used and the associated location(s) of the straps (and corresponding sleeves 306). In some examples, the spacers 1106 may be separate components that are attached to the slot support member 516. In other examples, the spacers 1106 may be integrally formed with the slot support member 516. In other examples, the slot support member 516 may be omitted and the spacers 1106 may be attached directly to the inner frame 504. Further, spacers 1106 may be formed of impact absorbing, resiliently deformable material (e.g., synthetic or natural polymeric material). In some such examples, discrete spacers, strips, or a ring of such material could be positioned to line the edges of the slot. As with FIGS. 8 and 10, the web 202 of the panel 114 has been omitted in FIG. 11 for the sake of clarity.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, and/or describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing structures, components, items, objects and/or things, and/or describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Example 1 includes an apparatus comprising a support member, a flexible elongate member to extend and retract through an opening in the support member, and a stop member including a region to interface with the flexible elongate member, the stop member to engage with structure of the support member surrounding the opening to limit a distance with which the flexible elongate member extends through the opening, the stop member to cooperate with the structure of the support member to maintain a gap between a surface of the region of the stop member and the structure of the support member, a width of the gap being equal to or greater than a thickness of the flexible elongate member.

Example 2 includes the apparatus of example 1, wherein the flexible elongate member includes a sleeve, the stop member to extend through the sleeve.

Example 3 includes the apparatus of any one of examples 1 or 2, further including a protrusion at a point of contact between the stop member and the structure of the support member, a size of the protrusion corresponding to the width of the gap.

Example 4 includes the apparatus of example 3, wherein the protrusion is on the stop member.

Example 5 includes the apparatus of example 3, wherein the protrusion is on the structure of the support member.

Example 6 includes the apparatus of any one of examples 1-5, wherein the stop member is elongate along a central axis, and the region corresponds to an inset surface of the stop member positioned between first and second protruding surfaces of the stop member, the inset surface a first distance from the central axis, the first protruding surface a second distance from the central axis greater than the first distance.

Example 7 includes the apparatus of example 6, wherein a difference between the first distance and the second distance corresponds to the width of the gap.

Example 8 includes the apparatus of any one of examples 6 or 7, wherein the stop member includes a core and first and second protruding segments rigidly attached to the core, an outer surface of the core corresponding to the inset surface, and an outer surface of the first protruding segment corresponding to the first protruding surface.

Example 9 includes the apparatus of any one of examples 6-8, wherein the flexible elongate member is associated with a panel, the panel to extend horizontally, the panel having a height extending from a lower edge to an upper edge, the inset surface extending a length along the stop member substantially corresponding to the height of the panel.

Example 10 includes the apparatus of any one of examples 6-9, wherein the inset surface is a first inset surface, and the flexible elongate member is a first strap, the apparatus further including a second strap, the first inset surface to interface with the first strap, the stop member including a second inset surface to interface with the second strap, the stop member including a third protruding surface positioned between the first and second inset surfaces.

Example 11 includes the apparatus of any one of examples 1-10, wherein the structure of the support member surrounding the opening includes spacers to engage the stop member, the spacers positioned at locations along the opening spaced apart from the region of the stop member when the stop member is engaging the structure.

Example 12 includes the apparatus of example 11, wherein a thickness of the spacers corresponds to the width of the gap.

Example 13 includes the apparatus of any one of examples 11 or 12, wherein the spacers include a first spacer to engage an upper end of the stop member and a second spacer to engage a bottom end of the stop member.

Example 14 includes the apparatus of example 13, wherein the spacers include a third spacer positioned between the first and second spacers.

Example 15 includes the apparatus of any one of examples 1-14, wherein the flexible elongate member is associated with a panel, the panel including an upper edge and a lower edge, at least one of the upper edge or the lower edge including an elongate component having a greater thickness than portions of the panel spaced apart from the at least one of the upper edge or the lower edge.

Example 16 includes the apparatus of example 15, wherein the elongate component is a cord.

Example 17 includes the apparatus of any one of examples 15 or 16, wherein the elongate component has a thickness of at least example 0 includes 25 inches.

Example 18 includes the apparatus of any one of examples 15-17, wherein the flexible elongate member is associated with a panel, the apparatus further including a roller supported by the support member in a vertical direction, the panel to wrap around the roller when the panel is retracted through the opening, the elongate component to facilitate different wraps of the panel around the roller to be at substantially consistent heights along a vertical length of the roller.

Example 19 includes an apparatus, comprising a first support member, a second support member to be spaced apart from the first support member, a panel having a distal end and a proximal end, the panel to extend between the first and second support members when in a blocking position with the proximal end supported by the first support member and the distal end supported by the second support member, a stop member to be supported by the panel adjacent the proximal end, the stop member to be urged against a first point of engagement on the first support member in response to a force applied to the panel when in the blocking position, and a bar to be supported by the panel adjacent the distal end, the bar to be urged against a second point of engagement on the second support member, a length of the panel extending between the stop member and the bar being greater than a distance between the first point of engagement and the second point of engagement by less than a thickness of the bar.

Example 20 includes the apparatus of example 19, further including an elongate flexible component to extend along an upper edge of the panel when in the blocking position, the elongate flexible component having a thickness of at least example 0 includes 25 inches.

Example 21 includes the apparatus of any one of examples 19 or 20, wherein the panel includes a pliable load bearing material, the pliable load bearing material to be attached to a first portion of the stop member, the stop member to interface with the first point of engagement at a second portion of the stop member spaced apart from the first portion of the stop member.

Example 22 includes the apparatus of any one of examples 19-21, further including a mounting plate to be attached to the second support member, the mounting plate to support a bracket corresponding to the second point of engagement, at least one of the mounting plate or the second support member including an elongate slot to selectively adjust the distance between the first point of engagement and the second point of engagement along a range defined by a length of the elongate slot.

Example 23 includes the apparatus of any one of examples 19-22, wherein the panel does not directly contact the first support member when the panel is extended in the blocking position and no force is applied to the panel.

Example 24 includes an apparatus comprising a support member, a panel to extend and retract through a slot in the support member, and a stop member having a dimension larger than the slot such that the stop member cannot pass through the slot, a load bearing material of the panel to be coupled to a first portion of the stop member, a second portion of the stop member to engage the support member surrounding the slot to limit an extent the panel is to extend out through the slot and to maintain a gap between a surface of the first portion of the stop member and the support member, the gap to provide clearance between the stop member and the support member through which the load bearing material is to pass.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a support member;
a flexible elongate member to extend and retract through an opening in the support member; and
a stop member including a region having a first surface to interface with the flexible elongate member, the stop member to directly engage a second surface of the support member surrounding the opening to limit a distance with which the flexible elongate member extends through the opening, the stop member to cooperate with the second surface of the support member to maintain a gap between the first surface of the region of the stop member and the second surface of the support member, a width of the gap being equal to or greater than a thickness of the flexible elongate member, the stop member being elongate along a central axis, the first surface corresponding to an inset surface of the stop member positioned between first and second protruding surfaces of the stop member, the inset surface a first distance from the central axis, the first protruding surface a second distance from the central axis greater than the first distance.

2. The apparatus of claim 1, wherein the flexible elongate member includes a sleeve, the stop member to extend through the sleeve.

3. The apparatus of claim 1, further including a protrusion at a point of contact between the stop member and the second surface of the support member, a size of the protrusion corresponding to the width of the gap.

4. The apparatus of claim 3, wherein the protrusion is on the stop member.

5. The apparatus of claim 3, wherein the protrusion is part of the support member, the second surface on the protrusion.

6. An apparatus comprising:
a support member;
a first strap to extend and retract through an opening in the support member;
a second strap; and
a stop member including a region to interface with the first strap, the stop member to engage with structure of the support member surrounding the opening to limit a distance with which the first strap extends through the opening, the stop member to cooperate with the structure of the support member to maintain a gap between a surface of the region of the stop member and the structure of the support member, a width of the gap being equal to or greater than a thickness of the first strap, the stop member elongate along a central axis, the region corresponding to a first inset surface of the stop member positioned between first and second protruding surfaces of the stop member, the first inset surface a first distance from the central axis, the first protruding surface a second distance from the central axis greater than the first distance, the first inset surface to interface with the first strap, the stop member including a second inset surface to interface with the second strap, the stop member including a third protruding surface positioned between the first and second inset surfaces.

7. An apparatus comprising:
a support member including spacers surrounding an opening in the support member;
a flexible elongate member to extend and retract through the opening; and
a stop member including a region having a first surface to interface with the flexible elongate member, the stop member to directly engage a second surface of the support member surrounding the opening to limit a distance with which the flexible elongate member extends through the opening, the stop member to cooperate with the second surface of the support member to maintain a gap between the first surface of the region of the stop member and the second surface of the support member, a width of the gap being equal to or greater than a thickness of the flexible elongate member, the spacers to engage the stop member, the second surface on the spacers, the spacers positioned at locations along the opening spaced apart from the region of the stop member when the stop member is engaging the second surface on the spacers.

8. The apparatus of claim 7, wherein a thickness of the spacers corresponds to the width of the gap.

9. The apparatus of claim 7, wherein the spacers include a first spacer to engage an upper end of the stop member and a second spacer to engage a bottom end of the stop member.

10. The apparatus of claim 1, wherein the flexible elongate member is associated with a panel, the panel including an upper edge and a lower edge, at least one of the upper edge or the lower edge including an elongate component having a greater thickness than portions of the panel spaced apart from the at least one of the upper edge or the lower edge.

11. The apparatus of claim 10, wherein the elongate component is a cord.

12. The apparatus of claim 10, wherein the elongate component has a thickness of at least 0.25 inches.

13. The apparatus of claim 10, further including a roller supported by the support member in a vertical direction, the panel to wrap around the roller when the panel is retracted through the opening, the elongate component to facilitate different wraps of the panel around the roller to be at substantially consistent heights along a vertical length of the roller.

14. An apparatus, comprising:
a first support member;
a second support member to be spaced apart from the first support member;
a panel having a distal end and a proximal end, the panel to extend between the first and second support members when in a blocking position with the proximal end supported by the first support member and the distal end supported by the second support member;
a stop member to be supported by the panel adjacent the proximal end, the panel including a pliable load bearing material to wrap around and be attached to a first segment of a longitudinal length of the stop member, a second segment of the longitudinal length of the stop member to be urged against a first point of engagement on the first support member in response to a force applied to the panel when in the blocking position, the second segment spaced apart from the first segment, the second segment to be urged against the first point of engagement without the load bearing material being urged against the first support member; and
a bar to be supported by the panel adjacent the distal end, the bar to be urged against a second point of engagement on the second support member, a length of the panel extending between the stop member and the bar being greater than a distance between the first point of engagement and the second point of engagement by less than a thickness of the bar.

15. The apparatus of claim 14, further including an elongate flexible component to extend along an upper edge of the panel when in the blocking position, the elongate flexible component having a thickness of at least 0.25 inches.

16. The apparatus of claim 14, further including a mounting plate to be attached to the second support member, the mounting plate to support a bracket corresponding to the second point of engagement, at least one of the mounting plate or the second support member including an elongate slot to selectively adjust the distance between the first point of engagement and the second point of engagement along a range defined by a length of the elongate slot.

17. The apparatus of claim 14, wherein the panel does not directly contact the first support member when the panel is extended in the blocking position and no force is applied to the panel.

18. An apparatus comprising:
a support member;
a roller to be supported by the support member;
a panel to extend and retract through a slot in the support member, the panel to wrap around the roller when the panel is retracted through the slot; and
a stop member having a dimension larger than the slot such that the stop member cannot pass through the slot, a load bearing material of the panel to be coupled to a first portion of the stop member, a second portion of the stop member to engage the support member at a perimeter of the slot to limit an extent the panel is to extend out through the slot and to maintain a gap between a surface of the first portion of the stop member and the perimeter of the slot, the gap to provide clearance between the stop member and the perimeter of the slot through which the load bearing material is to pass, the stop member to be spaced apart from the roller when the panel is extended through the slot.

* * * * *

UNITED STATES PATENT AND TRADEMARK OFFICE
CERTIFICATE OF CORRECTION

| | | |
|---|---|---|
| PATENT NO. | : 11,697,910 B2 | |
| APPLICATION NO. | : 16/999831 | |
| DATED | : July 11, 2023 | |
| INVENTOR(S) | : Wiegel et al. | |

It is certified that error appears in the above-identified patent and that said Letters Patent is hereby corrected as shown below:

On the Title Page

Item (54), and in the Specification, Column 1, Lines 1-2, in the title, delete "SAFELY" and insert
-- SAFETY --.

Signed and Sealed this
Twenty-second Day of August, 2023

Katherine Kelly Vidal
*Director of the United States Patent and Trademark Office*